United States Patent [19]

Weishaupt

[11] 3,897,250

[45] July 29, 1975

[54] METHOD AND APPARATUS FOR EXPOSING A LIGHT-SENSITIVE LAYER

[75] Inventor: Paul Weishaupt, Oberburg, Switzerland

[73] Assignee: Wagner & Cie AG, Burgdorf/ BE, Switzerland

[22] Filed: Apr. 30, 1973

[21] Appl. No.: 355,919

[30] Foreign Application Priority Data

May 15, 1972 Switzerland ........................ 7183/72

[52] U.S. Cl. .................. 96/27 E; 96/27 R; 96/45.2; 355/52

[51] Int. Cl. ............................................... G03c 5/04

[58] Field of Search ................ 96/27 E, 27 R, 45.2; 355/80, 81, 52

[56] References Cited

UNITED STATES PATENTS

| | | | |
|---|---|---|---|
| 2,480,422 | 8/1949 | Simmon | 96/45.2 |
| 2,480,423 | 8/1949 | Simmon | 96/45.2 |
| 2,480,425 | 8/1949 | Simmon | 96/45.2 |
| 3,085,469 | 4/1963 | Carlson | 96/27 E |
| 3,615,433 | 10/1971 | Biernson | 96/27 E |

*Primary Examiner*—Norman G. Torchin
*Assistant Examiner*—Edward C. Kimlin
*Attorney, Agent, or Firm*—Werner W. Kleeman

[57] ABSTRACT

A method of and apparatus for exposing a light-sensitive layer employed for the manufacture of reproductions of black-and-white or colored patterns, wherein the image of the pattern which has been projected onto a support is taken by means of an electronic camera and stored in a recording carrier. The light-sensitive layer initially is purely optically exposed with the image of the pattern. The light-sensitive layer is also additionally exposed with the stored image for correction of contrast and/or color shade.

7 Claims, 3 Drawing Figures

METHOD AND APPARATUS FOR EXPOSING A LIGHT-SENSITIVE LAYER

BACKGROUND OF THE INVENTION

The present invention relates to an improved method of exposing a light-sensitive layer employed for the production of reproductions of black-and-white or color patterns, in that the image of the pattern projected upon a support is taken by means of an electronic camera and stored at a recording carrier, and the light-sensitive layer is initially purely optically exposed with the image of the pattern. The invention also relates to an improved apparatus for the performance of the method which is of the type incorporating a support table for the light-sensitive layer and a purely optical projection device for the projection of the pattern at the support table, a first device with an electronic camera for producing video signals from the pattern projected at the support table and a video recording device for recording the video signals at a recording carrier.

During reproduction techniques for the fabrication of printing forms, a light-sensitive layer, preferably applied to a film, is exposed as is known with the image of the pattern, in order to thus produce a printing form. During the exposure or illumination of the light-sensitive layer, it is possible in particular to overcome general errors for color reproductions, which for instance could arise through the color selection for printing, or also contrast errors through the use of so-called masking techniques. The known masking techniques operate in a subtractive manner in that —starting from colored patterns, whether such be photographic slides or direct visual patterns— there is initially fabricated a color film negative through the use of certain color filters and then after developing the same such is placed upon the pattern. By virtue of these measures there automatically is increased the opaqueness of the patterns by a factor of 10 to 20. To compensate such effect there is required a greater quantity of light for this reproduction technique. During the projection of such patterns which are coated with a number of color film negatives, so-called sandwich patterns, at the light-sensitive layer by means of optical devices there occur diffusion disturbance effects leading to impairment of contrast, wherein for instance there must be taken into account flattening of the photographic sound recording values in contrast to the patterns.

Furthermore, such type correction masks are indifferent, in other words, when it is desired to change the mode of operation of the mask during the reproduction technique, then it is necessary to produce new color film negatives, requiring an additional expenditure in work, so that the fabrication procedures are considerably delayed.

If printing forms of colored patterns are to be fabricated for roller offset printing, then it is furthermore necessary to produce additional correction masks for secondary color separation.

SUMMARY OF THE INVENTION

Hence, it is a primary object of the present invention to provide an improved method of, and apparatus for, activation of the light-sensitive layer in a considerably simplified manner for the reproduction-technological fabrication of printing forms, and wherein the above-mentioned drawbacks do not occur.

The inventive method is manifested by the features that for the correction of the contrast and/or the color or hue the light-sensitive layer is additionally exposed with the stored image.

The inventive apparatus is manifested by the features that there is provided a second device for the additional projection of the image of the pattern stored at the recording carrier at the light-sensitive layer.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
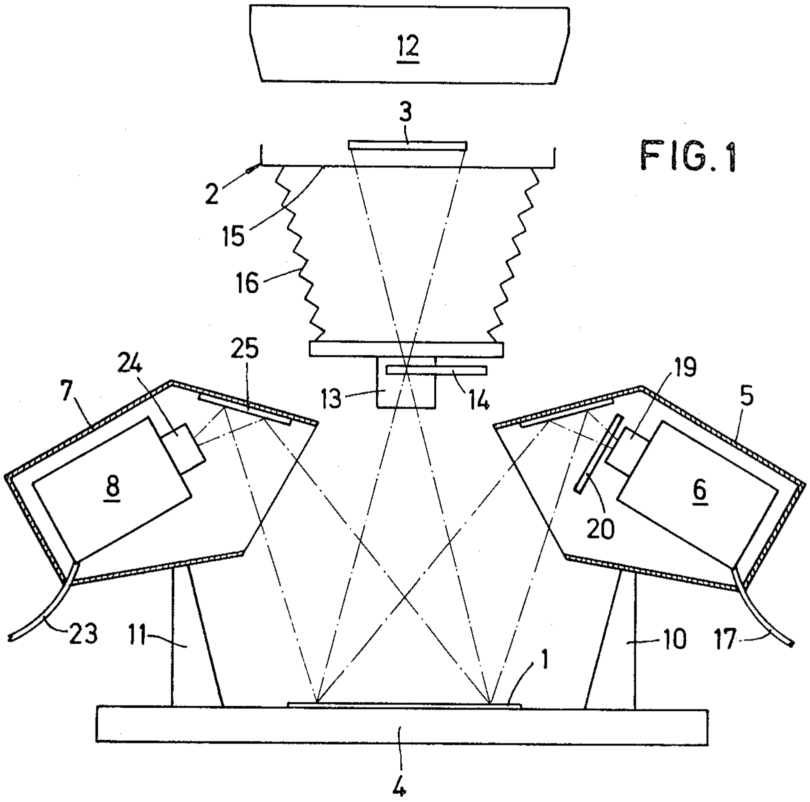
FIG. 1 schematically illustrates part of the apparatus for the performance of the inventive method.
Figure 2:
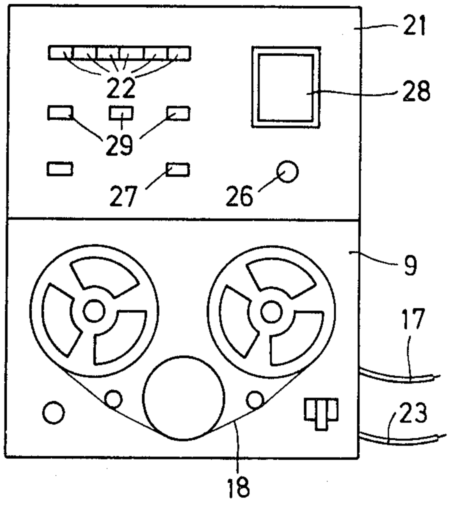
FIG. 2 illustrates a video recording device with a control mechanism.

Describing now the drawings, the apparatus which has only been schematically depicted in FIG. 1, for the exposure of a light-sensitive layer 1, encompasses a purely optical device 2 for the projection of a photographic slide pattern 3 or the like upon the light-sensitive layer 1 which is situated upon support table 4. The apparatus further comprises a first mechanism 5 having an electronic camera 6, a second mechanism 7 with a playback or reproduction device 8, and a video recording device 9 illustrated in detail in FIG. 2. The first and second mechanisms or devices 5 and 7 are retained by means of supports 10 and 11 respectively over the support table 4. Behind the photographic slide pattern 3 there is provided a light source 12 which delivers the quantity of light needed for the exposure of the light-sensitive layer 1.

The projection device 2 possesses an objective 13 equipped with a filter mechanism 14. This objective 13 is connected with a holding device 15 for the slide pattern 3 via an extendable bellows or diaphragm 16, so that it is possible to attain an exact sharp focussing adjustment of the projected image of the photographic slide pattern 3.

The exposure of the light-sensitive layer 1 is carried out in the following way. Initially, instead of the light-sensitive layer 1, there is placed upon the support table 4 a non-illustrated white substrate or support and the photographic slide pattern 3 is projected onto this support. The image which has been projected onto the support is then taken by the electronic camera 6 which is housed at the device 5 and transformed into electrical signals. These signals arrive via a cable 17 at the video recording device 9 and are stored at a recording carrier 18.

A filter mechanism 20 is arranged in front of the objective 19 of the camera 6. This filter mechanism 20 encompasses at least color filters for the primary or base colors, so that at least three corresponding recordings of the image of the slide pattern 3 can be stored at the recording carrier 18 which is preferably a video tape. In this way it is possible to successively store different modulated image sequences wherein the filter device 14 of the projection apparatus 2 and the filter device 20 of the camera 6 can be remotely controlled through actuation of keys 22 by non-depicted drives from a control mechanism 21 associated with the recording device 9.

Preferably for each printing ink cyanogen, magenta, yellow and black, there is stored a respective reproduction of the image of the pattern 3 at the recording carrier 18. Subsequently, the above-mentioned white support or substrate is removed from the support table 4 and the light-sensitive layer 1 is placed upon such support table. Thereafter this layer 1 is exposed by means of the purely optical device 2 and at the same time or thereafter there occurs an additional exposure of the light-sensitive layer 1 by the second device 7 which contains the reproduction device 8 for the image sequence stored at the recording carrier 18. In the reproduction device 8 there is provided a non-visible television projection tube which has delivered thereto the video signals via a cable 23 from the video recording device 9. The color-corrected image of the pattern 3 appearing at the screen of the television projection tube is projected by means of an objective 24 of the reproduction device 8, and a mirror 25 at the light-sensitive layer 1. The contrast of the additional image of the pattern 3 projected at the light-sensitive layer 1 can be changed with an adjustment knob 26 of the control mechanism 21 and accommodated to the required value. Furthermore, the control mechanism 21 possesses a reversing switch means 27 by means of which the video signals can be switched-over, so that selectively there can be carried out a positive or a negative projection of the stored image of pattern 3. Moreover, the control mechanism 21 also possesses a monitor 28 for controlling the image to be projected.

At the control mechanism 21 there are preferably stored a number of programs, for instance 3 programs, and according to which programs the above-discussed method steps can be automatically carried out. These individual programs can be selected by selector buttons or keys 29, so that after actuation of one of such selector keys 29 it is possible to automatically carry out a certain exposure operation.

Figure 3:
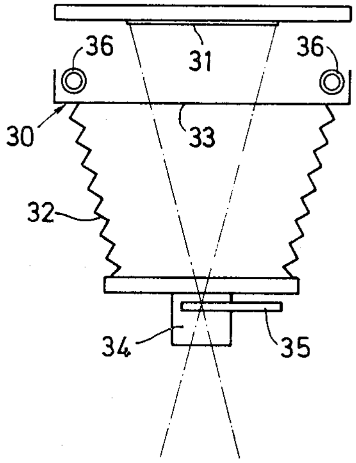
FIG. 3 schematically illustrates an optical device for the projection of a non-transparent pattern.

In FIG. 3, there is illustrated in very simplified form, a different purely optical device or mechanism 30 which may be used in place of the purely optical device 2 for the projection of a non-transparent pattern 31 at a light-sensitive layer such as, for example, the light-sensitive layer 1 of FIG. 1. This mechanism 30 likewise contains an objective 34 provided with a holding device 33 connected via a bellows 32, and which objective 34 has associated therewith a filter mechanism 35. In the holding device 33 there are arranged light sources 36 for the illumination of the pattern 31.

During the use of the above-described technique, the greatest proportion of the image information of the pattern is directly transmitted in purely optical manner to the light-sensitive layer 1 and only a small portion, about 5% to 15% of the image information, arrives via the additional exposure providing a color-correcting and/or contrast correcting effect, at the light-sensitive layer 1. In this way, practically the entire image information is transmitted to the light-sensitive layer 1.

The limited resolution capacity of the electronic camera 6 and the reproduction device 8 is more than compensated by the complete elimination of the diffusion disturbance effects, which occur when using the known sandwich patterns, and the shape of the contrast curve is decisively improved. Hence, there results for all of the shade value regions of the reproduction improved reproduction effects.

The above-described method possesses in contrast to the known purely optical techniques the following advantages:

1. Correction masks are no longer required therefore the time-consuming development of such masks is eliminated;

2. The electronic image can be randomly modulated and can be positively or negatively employed at the main exposure; and 3. The image storage material can be reused a number of times.

While there is shown and described present preferred embodiments of the invention, it is to be distinctly understood that the invention is not limited thereto, but may be otherwise variously embodied and practiced within the scope of the following claims.

What is claimed is:

1. A method of exposing a light-sensitive layer employed for the manufacture of reproductions of black-and-white or color patterns comprising the steps of:
projecting the image of a pattern onto a white or reflective support support;
viewing the projected pattern image on the support with an electronic camera having a video output signal;
storing the video output signal on a recording carrier;
optically exposing all points of a light-sensitive layer with the pattern image using broad-surface illumination which provides a major portion of the total exposure;
additionally exposing the light-sensitive layer with a projected image derived from the video output signal stored on the recording carrier which provides a small portion of the total exposure for correcting contrast or color shades or both of the pattern reproduced on the light-sensitive layer.

2. The method as defined in claim 1, including the step of interposing a color filter between the pattern and the electronic camera for color correction during the viewing of the projected pattern image by the electronic camera.

3. The method as defined in claim 1, including the step of varying the amplitude of the stored video output signal used to additionally expose the light-sensitive layer for carrying out contrast correction.

4. The method as defined in claim 1, including the step of reversing the polarity of the stored video output signal used to additionally expose the light-sensitive layer for projecting a positive or negative image of the stored video output signal.

5. The method as defined in claim 1, wherein the additional exposure of the light-sensitive layer occurs simultaneously with the simultaneous optical exposure thereof with the broad surface illumination.

6. The method as defined in claim 1, wherein the additional exposure of the light-sensitive layer occurs subsequently of the simultaneous optical exposure thereof with the broad surface illumination.

7. The method as defined in claim 1, including the step of separately storing on the recording carrier a video output signal for each primary color and additionally exposing the light-sensitive layer with projected images derived from the video output signal of each such stored recording.

* * * * *